United States Patent [19]

Klingel

[11] Patent Number: 5,204,987
[45] Date of Patent: Apr. 20, 1993

[54] APPARATUS FOR TREATING STEEL EDGES OF SKIS AND OTHER RUNNER DEVICES

[76] Inventor: Hans Klingel, Teckstr. 9, D-7141 Möglingen, Fed. Rep. of Germany

[21] Appl. No.: 767,412

[22] Filed: Sep. 30, 1991

Related U.S. Application Data

[62] Division of Ser. No. 479,062, Feb. 12, 1990.

[51] Int. Cl.⁵ .................................................. B23K 26/00
[52] U.S. Cl. ............................ 219/121.6; 219/121.77; 219/121.82; 280/608
[58] Field of Search ........... 219/121.6, 121.85, 121.82, 219/121.77; 280/608

[56] References Cited

U.S. PATENT DOCUMENTS

| | | | |
|---|---|---|---|
| 4,017,708 | 4/1977 | Engely et al. | 219/121.6 |
| 4,250,372 | 2/1981 | Tani | 219/121.65 |
| 4,507,538 | 3/1985 | Brown et al. | 219/121.6 |
| 4,924,062 | 5/1990 | Zurcher | 219/121.6 |

Primary Examiner—C. L. Albritton

[57] ABSTRACT

A ski has better guide properties the sharper the corner areas of the steel edge profiles. Using a laser beam, the corner areas of the steel edge profiles are hardened on the ski.

33 Claims, 4 Drawing Sheets

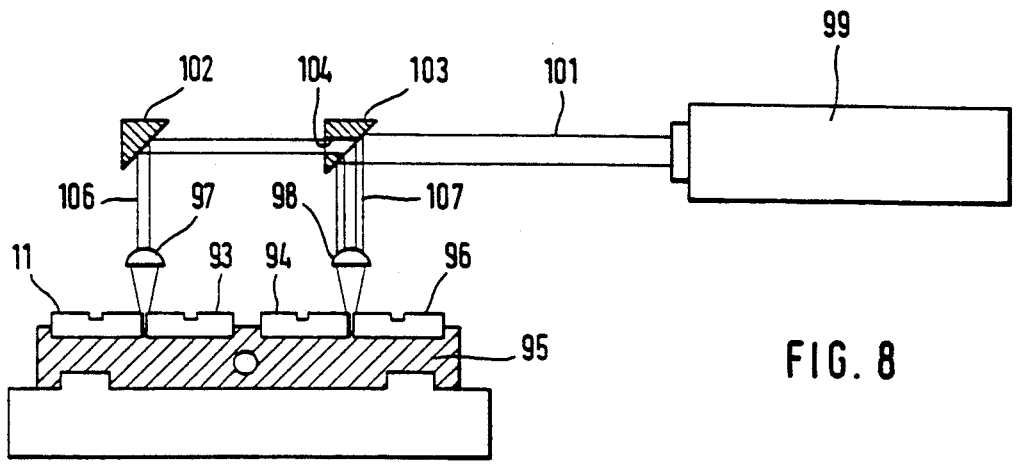
FIG. 8
FIG. 9
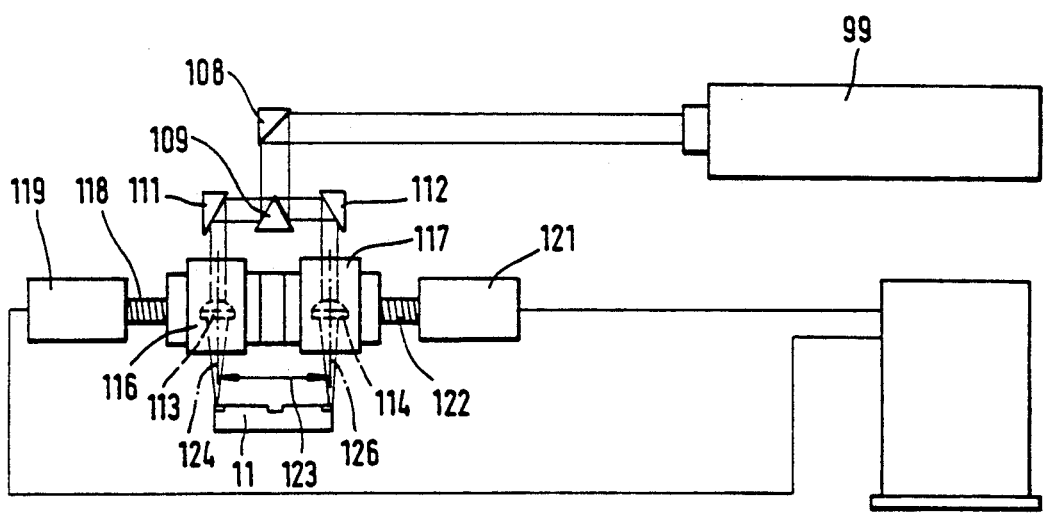

5,204,987

APPARATUS FOR TREATING STEEL EDGES OF SKIS AND OTHER RUNNER DEVICES

This is a divisional of copending patent application Ser. No. 07/479,062 filed Feb. 12, 1990, of the same inventor.

The invention relates to an apparatus for treating the steel edges of skis and other runner devices.

BACKGROUND OF THE INVENTION

Skis and other runner devices of this type have a runner base top layer with a first outer surface, two steel edge profiles mounted on two longitudinal edges of the runner base top layer, each with a second outer surface facing downwards when in use and a third outer surface facing laterally and forming a corner edge area with the second outer surface. Steel edges of this type are found predominantly on skis but also on skate runners or the like. Whether the steel edges are sharp and remain sharp determines to a large extent the properties of skis. Sharp steel edges afford good guide properties, in particular on ice. The runner top layer on skis is plastic. Its outer surface must essentially coincide with the outer surface of the steel edges parallel to it, and that is why the steel edge profile of a ski blank having a runner base and steel edges is ground down until it has the desired height relative to the outer surface of the runner base top layer. In order to facilitate this working down, relatively soft steel edge profiles are used, for example with a value of Rc48. A relatively rapid blunting of the steel edge profiles is consequently accepted.

OBJECTS AND STATEMENTS OF THE INVENTION

An object of the Invention is to provide an apparatus so that optimum hardness of the steel edge profiles is achieved, at least in their edge corner region, without hindering the matching of the steel edge profiles with the outer surface of the runner base top layer.

According to the invention, the object is achieved by the following features:
 a) leveling means for leveling the heights of the first and second outer surfaces if they are not level relative to each other,
 b) laser beam means having a point of incidence for bringing at least the corner edge area to the hardening temperature of the steel edge profile,
 c) means for moving the laser beam and runner device relative to each other in the longitudinal direction of the steel edge profile, and
 d) means for drawing off heat to prevent detrimental heating up of the volume of the runner device around the steel edge profile in the area of the point of incidence of the laser beam.

It is therefore possible to start from a soft steel edge profile, which is identical to that used previously, and to match this to the outer surface of the runner base top layer without changing the previous expenditure for technical equipment, and to harden at least the edge region optimally afterwards. It is, however, also possible to take steel edge profiles which are softer than those used previously, the working down taking place substantially more advantageously than previously (for example more rapid working down, cheaper steel edge profiles) while still achieving and optimum hardness.

Advantageously, the invention includes the following additional features, some of which are alternative embodiments:
 a) means for levelling the heights by machining down a first outer surface with excessive dimensions to match the second outer surface,
 b) means for levelling the heights by machining down a second outer surface with excessive dimensions to match the first outer surface,
 c) means for levelling the heights by working down a first outer surface with excessive dimensions at least in the area of the second outer surface to the height of the second outer surface,
 d) means for bringing at least the edge area to a temperature greater than 600 degrees C.,
 e) means for bringing at least the edge area to a temperature greater than 700 degrees C.,
 f) means for maintaining the hardening temperature for a duration sufficient for the formation of austenite corresponding to the desired hardness,
 g) while allowing the formation of martensite, means for drawing off heat to protect the connection between steel edge profile and runner device, as well as the material around the steel edge profile, from the undesired influence of heat,
 h) means for drawing off heat by employing a cooling device that comprises metal rails having a close fitting bearing surface for the second and/or third outer surfaces,
 i) employing metal rails composed of copper,
 j) employing metal rails with bearing surfaces that are planar,
 k) employing metal rails with bearing surfaces that have a minimum distance from the point of incidence of the laser beam,
 l) employing metal rails with bearing surfaces that extend at least as far as the vicinity of an edge of the second and/or third bearing surfaces of the steel edge profiles that lies at a distance from the edge area,
 m) employing metal rails having a surface facing towards the runner device that has a projection which contains the bearing surface and otherwise is essentially not in contact with the runner device,
 n) employing a metal rail according to feature m) above that is otherwise not at all in contact with the runner device,
 o) employing a metal rail that has an incline on a side facing the edge area,
 p) employing metal rails that are cooled,
 q) employing metal rails that are cooled by liquid,
 r) means for cooling the metal rails by employing the thermal capacity of the metal rails,
 s) means for bringing the edge area to the hardening temperature of the steel by directing the point of incidence of the laser towards the second outer surface,
 t) means for hardening the steel edge profile over a depth of several tenths of a millimeter,
 u) means for hardening the steel edge profile over a width between 0.3 and 1.8 mm.,
 v) means for hardening the steel edge profile over a width of about 1.5 mm.,
 w) means for hardening the steel edge profile to a hardness of 600–900 HV,
 x) means for moving the laser beam and runner device relative to each other at a speed in the range from 0.5–3 m/mm., y) means for moving the laser beam relative to the runner device at a speed of about 1.5 m/min.,
z) employing a laser power in the range 150–600 W.,
aa) employing laser power of about 300 W.,
bb) means for hardening two steel ledges simultaneously,
cc) employing two laser beams that are split from the same original laser beam,
dd) means for hardening two steel edges of the same runner device,
ee) means for hardening adjacent steel edges of two runner devices moved parallel to one another,
ff) employing a point of incidence of the laser beam that is greater than the focal point in the focal plane of the laser beam.

Another object of the invention is achieved by skis and other runner devices made by the above described method. A further object of the invention is also achieved by the use in professional skiing competition of skis made by the above described apparatus.

The invention will now be described with reference to preferred exemplary embodiments.

In the drawings:

FIG. 1 shows a cross-section through a ski,

FIG. 2 shows a diagrammatic cross-section through the left upper area of FIG. 1 with applied metal rails, FIG. 3 shows a cross-section similar to FIG. 2 with the hardened area shown in detail, FIG. 4 shows a perspective view of a first device according to the invention, FIG. 5 shows a diagrammatic representation of the point of incidence of the laser beam, FIG. 6 shows a side view o a device similar or identical to FIG. 4, FIG. 7 shows a plan view of another exemplary embodiment, FIG. 8 shows a cutaway diagrammatic view of a device for treating adjacent steel edges, FIG. 9 shows a diagrammatic view of another device according to the invention, seen in the longitudinal direction of the ski.

DETAILED DESCRIPTION

Figure 1:
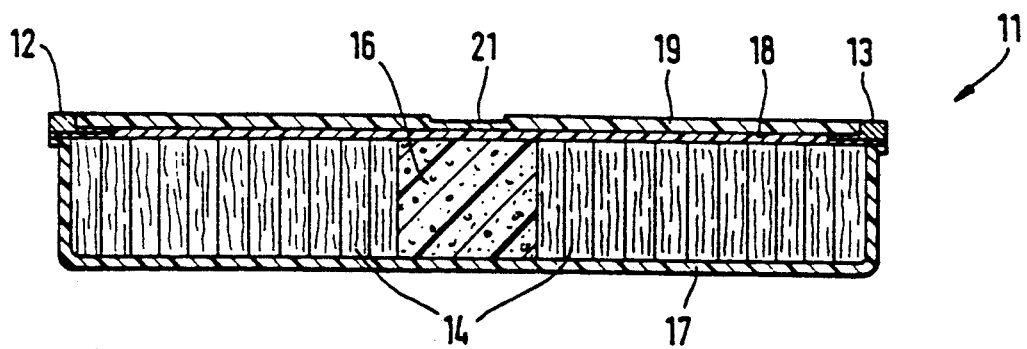
Figure 2:
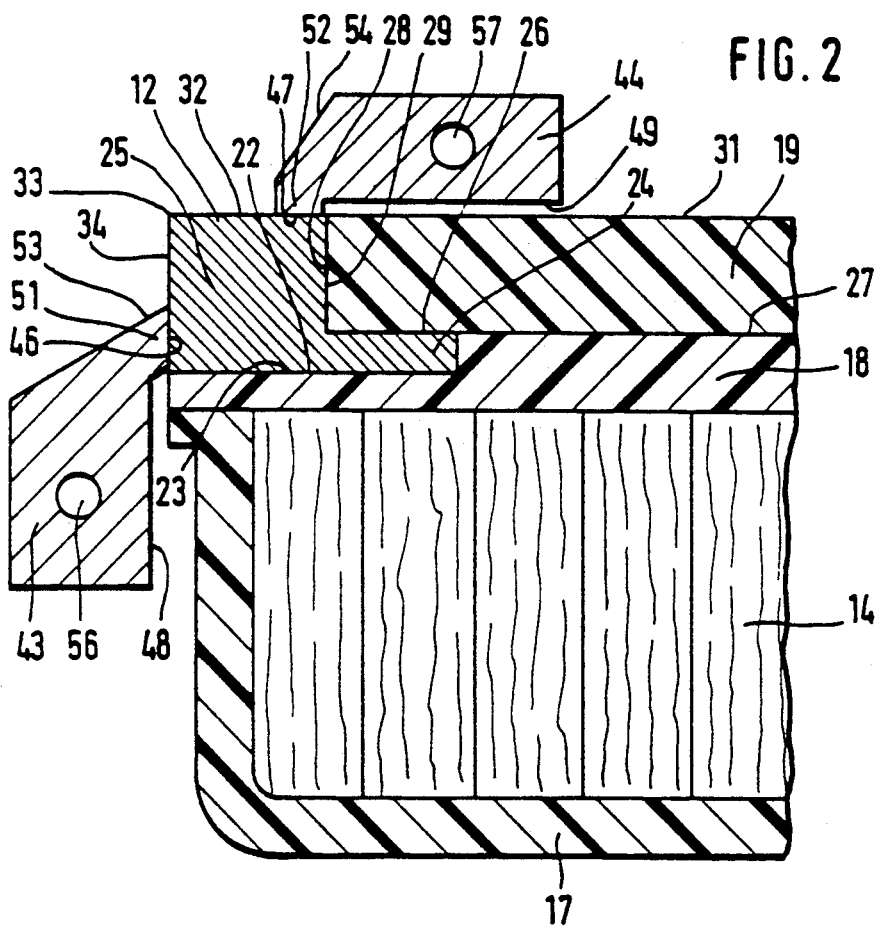

According to FIG. 1, a ski 11 has two steel edge profiles 12, 13, strips of laminated wood 14 and a plastic foam filling 16. The strips of laminated wood 14 and the plastic foam filling 16 are covered by a plastic profile 17 according to FIG. 1. A runner base underlayer 18 of plastic is adhesively bonded to this construction, to the top when in the processing state and the bottom when in the use state. A runner base top layer 19, which has a groove 21 in its center, is in turn adhesively bonded onto this under-layer. Since the relations between the steel edge profile 13 and the steel edge profile 12 are symmetrically identical, only the latter will be described further with reference to FIGS. 2 and 3. The underlayer 18 has at is outermost point a longitudinally linear step 22 into which a top side 23 of the steel edge profile 12 is adhesively bonded, to be precise together with an inwardly pointing extension 24 having an l-shaped profile which starts from the rectangularly-shaped body 25 of the steel edge profile 12. The underside 26 of the extension 24 lies at the same height as the underside 27 of the underlayer 18 so that the top layer 19 projecting towards the left overlaps the extension 24, is bonded there to the extension 24 and also abuts the inner flank 29 of the body 25, bonded by its end surface 28.

The top layer 19 has an underside 31 which lies at the same height as an underside 32 of the body 25. One or more finishing stages earlier, the underside 32 still protruded from the underside 31 and was then ground down flush with the underside 31. The underside 32 becomes a corner area 33 which, at the bottom according to FIG. 2 adjoins an outer side 34 at right angles to the underside 32. Both the underside 32 and the outer side 34 are linear and plane.

Figure 3:
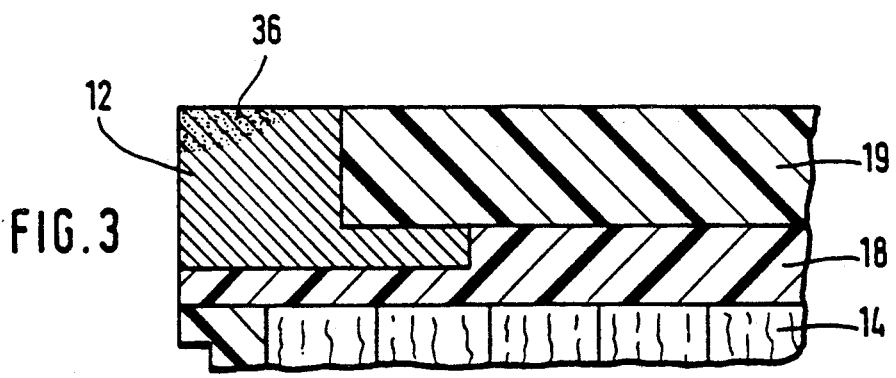

In FIG. 3, drawn to scale, the outer side 34 is 2 mm high, the underside 32 is 2 mm wide and using the method according to the invention, together with its devices, a hardened area 36 is obtained which extends towards the right in the shape of a sector into the underside for approximately 1.5 mm and follows the outer side 34 downwards for approximately 0.3 mm The corner area 33 is thus completely hardened. It has a hardness of 870 HV. This corresponds to the hardness of high-speed steel. There exists therefore a hard area and a resilient area, which provides a very good combination especially for the field of use by downhill skiers for whom, for example as compared with ski jumpers, the properties of the edges are important. The prerequisite for hardness is a carbon content of, for example 0.3%. The steel edge profiles previously employed can be used, which are relatively hard from the start, but it is alternatively possible to start from softer steel edge profiles than previously the underside 32 of which can then be worked down more easily to the level of the underside 31 and a hardened area 36 of the desired hardness is then obtained later. The hardness can be selected in dependence on the field of use. For a downhill ski which is used only once or twice for competitive purposes, the hardened area 36 can be made brittle. Such a high hardness will not be selected for most skiers and the requirement that they sometimes travel over stones will be the guiding one, yet the corner area 33 must nevertheless be prevented from breaking off. For this group of people, care must be taken when treating the steel edge profiles 12, 13 that sufficient material is available for the subsequent grinding, which has now become a genuine subsequent grinding.

Figure 5:
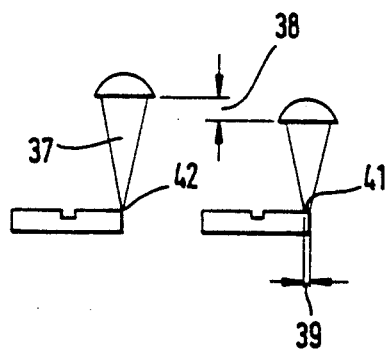

The hardened area 36 is created by allowing a laser beam to strike it, to be precise either by allowing, according to FIG. 5, a laser beam 37 to strike the focal plane or, more preferably, as a result of changing a distance 38, by working with a point of incidence 41, having a certain width 39, which is wider than the point of incidence 42.

It is not sufficient merely to supply heat. Rather, as the ski 11 is finished and the areas surrounding the steel edge profile 12, 13 should not, or no to too great an extent, be negatively influenced, the heat must also be drawn off. This takes place using metal rails 43, 44 made from copper which bear against the outer side 34 and the underside 32 respectively with bearing surfaces 46, 47, at a distance from the corner area 33 and allowing sufficient space for the laser beam. As drawn in FIG. 2, there is a gap between the inner surfaces 48, 49 and the remaining parts of the ski so that no heat is transferred there. The projections 51, 52 of the metal rails 43, 44 extend no further than the upper side 23 and the flank 29 respectively and are not in contact with the plastic. The projections 51, 52 cover approximately a third to a quarter of the outer side 34 and the underside 32 respectively at the respective points. In order to make the corner area 33 more open, both metal rails 43, 44 have inclines 53, 54. Water flows through longitudinal bores 56, 57 in order to inevitably cool the metal rails 43, 44. The bearing surfaces 46, 47 are pressed firmly by means which are not shown so that good thermal conductivity results.

Figure 4:
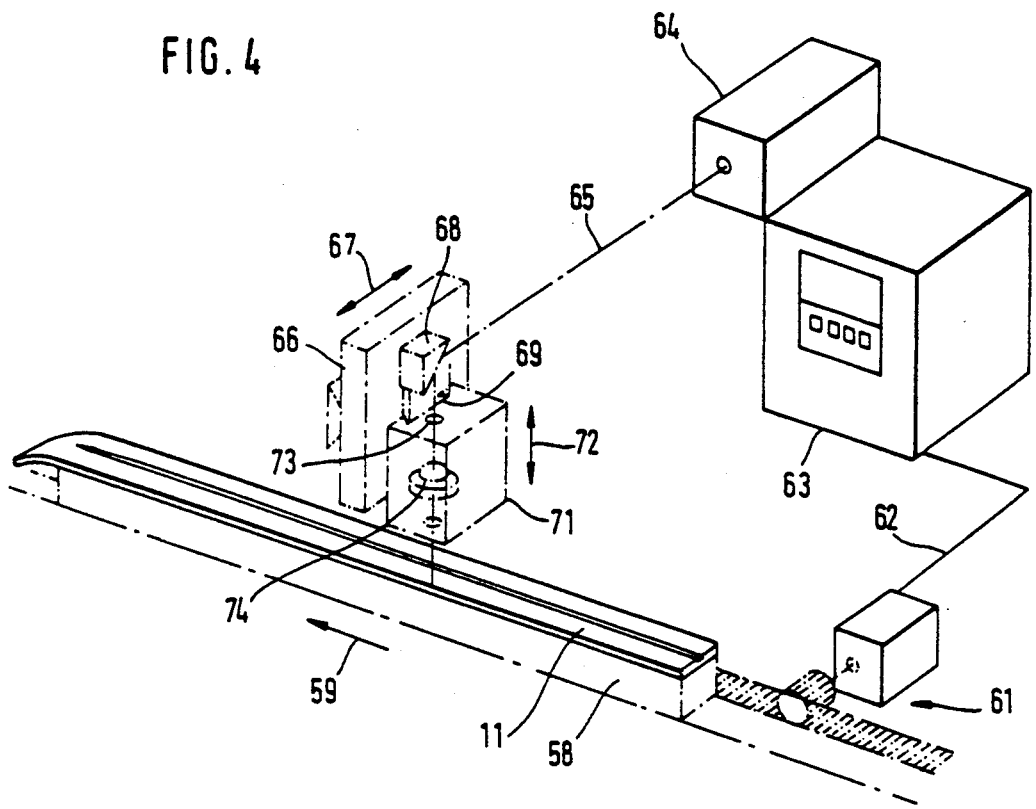

According to FIG. 4, the ski 11 is fastened to a bed 58 which is driven in the direction of the arrow 59 via a gear 61 which is here symbolized by a motor, a pinion and a rack. The gear 61 is controlled via a line 62 by a control 63 which is also actively connected to a laser cavity 64. The latter generates a laser beam 65. A deflecting mirror 68, which deflects the laser beam perpendicularly downwards, is provided on a support 66 which is stationary relative to the ski 11 and which can be moved to the left or to the right in the direction of a double-headed arrow 67. A displacement part 71 is mounted via a dovetail guide 69 so as to be upwardly and downwardly displaceable in the direction of a double-headed arrow 72. The laser beam 65 can be beamed downwards unobstructed through a through-hole 73 in the displacement part and in so doing passes a lens 74 which is provided in the displacement part 71. This lens refracts the laser beam 65 in the desired manner depending on which geometry of the point of incidence is desired according to FIG. 5. The metal rails 43, 44 are not shown in FIG. 4. Cooling could also take place using a very well-directed jet of air which, however, should not simultaneously cool the hardened area 36 as a result of its geometry and screening because isothermic maintaining of the temperature, which is a prerequisite for hardening, is otherwise impossible. The isothermic maintenance times lie in the region of approximately 1 to 10 seconds.

Figure 6:
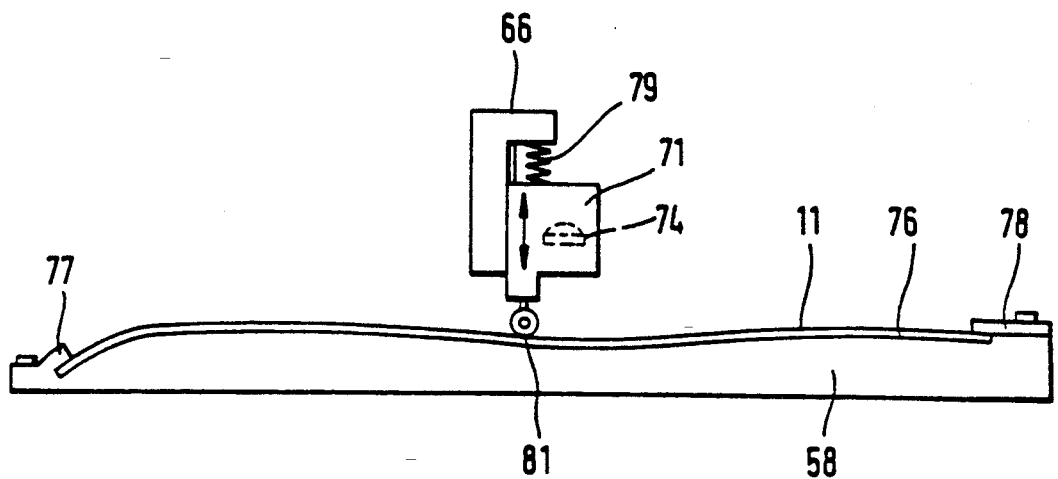
Figure 7:
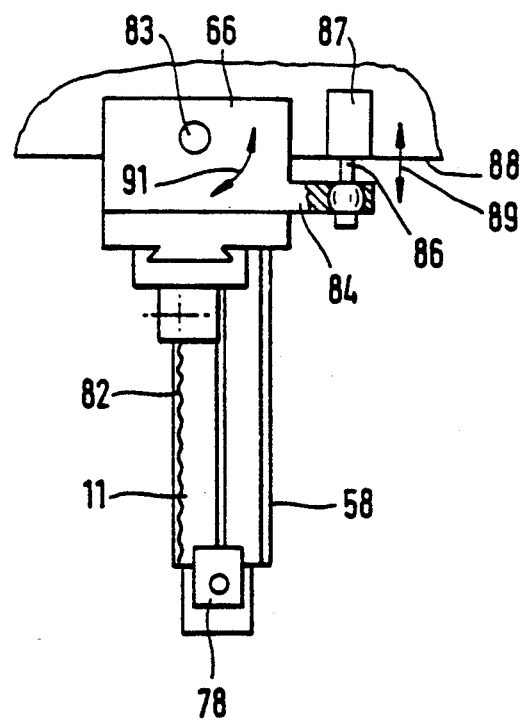

According to FIG. 6, the bed 58 has the same curved upper surface 76 as the ski 11 has later. Tensioning means 77, 78 are shown diagrammatically at the end and beginning of the ski 11. The metal rails 43, 44 also serve as tensioning means to a certain extent. So that the displacement part 71 can follow the various heights, it is on the one hand pressed downwards by a spring 79 which on the one hand bears against the support 66 and on the other hand against the displacement part 71. A lead wheel 81, which is fastened to the displacement part 71 and therefore runs in the colder zone, serves to maintain a constant distance from the metal rails 43, 44.

When a geometry according to the left half of FIG. 5 is used, the greater incident heat can be distributed by wobbling the laser beam 65. To facilitate comprehension, a wavy line 82 is provided here which, of course, in reality has a much shorter period. In order to achieve this, the support 66 can pivot about a perpendicular pin 83. A projection 84 t which is attached a tappet 86 of an oscillating motor 87, which in turn is attached to a structural part 88 which cannot move relative to the pin 83, is provided on the right of the support 66. When the tappet 86 oscillates in its longitudinal direction in the direction of the double-headed arrow 89, then the support 66 pivots about the pin 83 in the direction of the double-headed arrow 91. Of course, in view of FIG. 3, the amplitudes are very small, for example half of 1.5 mm, i.e. 0.75 mm.

According to FIG. 8, a total of our skis 11, 93, 94, 96 lie on the bed 95. The lenses 97, 98, according to the right half of FIG. 5, generate a relatively wide point of incidence. The skis 11, 93 on the one hand and 94, 96 on the other hand lie with their steel edge profiles close together so that the laser beam cannot slip through a detrimental gap. Since the point of incidence is sufficiently wide, two hardened areas 36 can be created simultaneously. The cooling means, for example metal rails, which are not shown, are of course also provided here. A laser beam 101 is generated here by a single cavity 99 and deflected downwards by mirrors 102, 103. Because the mirror 103 has a central through-hole 104, the mirror 102 is also struck. The total energy in the two partial beams 106 and 107 must, of course, be identical because the skis 11, 93, 94, 96 lie on the same bed 95.

In the exemplary embodiment in FIG. 9, the cavity 99 also generates a single laser beam which is sent downwards via a first mirror 108, is there split by a prism, 109 to the right and to the left and are then deflected downwards by two mirrors 111, 112 and passes in each case through a lens 113, 114 which is connected to displacement parts 116, 117. The mirror 111 and the lens 113 are unalterably related to each other, as are the mirror 112 and the lens 114. A spindle 118 is driven by a motor 119 and can move 111, 113, 116 to the left or to the right. The same applies with regard to the motor 121 for a spindle 122. In this way, a varying distance 123 can be achieved between the downwardly directed partial beams 124, 126 so that the varying distance of the steel edge profiles 12 13 can be matched for different skis 11.

If the undersides 31, 32 lie on the same plane from the outset, the feature a) can be omitted from the description of the invention on page 2 hereof. Furthermore, it is also possible to harden the steel edge profiles 12 separately before assembling the individual parts of the ski 11 and to construct the ski 11 using these steel edge profiles 12 which have already been fully hardened and optionally ground.

I claim:

1. Apparatus for treating the steel edges of skis and other runner devices that have a runner base top layer with a first outer surface, two steel edge profiles mounted on two longitudinal edges of the runner base top layer, each with a second outer surface facing downwards when in use and a third outer surface facing laterally and forming a corner edge area with said second outer surface, comprising:
    a) leveling means for leveling the heights of the first and second outer surfaces if they are not level relative to each other,
    b) laser beam means having a point of incidence for bringing at least the corner edge area to the hardening temperature of the steel edge profile,
    c) means for moving the laser beam and runner device relative to each other in the longitudinal direction of the steel edge profile, and
    d) means for drawing off heat to prevent detrimental heating up of the volume of the runner device around the steel edge profile in the area of the point of incidence of the laser beam.

2. Apparatus according to claim 1, wherein said leveling means comprises means arranged to level the heights by machining down a first outer surface with excessive dimensions to match the second outer surface.

3. Apparatus according to claim 1, wherein said leveling means comprises means arranged to level the heights by machining down a second outer surface with excessive dimensions to match the first outer surface.

4. Apparatus according to claim 1, wherein said leveling means comprises means arranged to level the heights by working down a first outer surface with excessive dimensions at least in the area of the second outer surface to the height of the second outer surface.

5. Apparatus according to claim 1, wherein said laser means comprises means arranged to bring at least the corner edge area to a temperature greater than 600 degrees C.

6. Apparatus according to claim 1, wherein said laser means comprises means arranged to bring at least the corner edge area to a temperature greater than 700 degrees C.

7. Apparatus according to claim 1, wherein said laser means comprises means arranged to maintain the hardening temperature for a duration sufficient for the formation of austenite corresponding to the desired hardness.

8. Apparatus according to claim 1, wherein said heat drawing means comprises means to protect the connection between steel edge profile and runner device a well as the material around the steel edge profile from the undesired influence of heat while allowing the formation of martensite.

9. Apparatus according to claim 8, wherein said heat drawing means comprises metal rails having a close fitting bearing surface for one or more of the surfaces in the corner edge area.

10. Apparatus according to claim 9, wherein said metal rails are composed of copper.

11. Apparatus according to claim 9, wherein said metal rails have bearing surfaces that are plane.

12. Apparatus according to claim 11, wherein said bearing surfaces have a minimum distance from the point of incidence of the laser beam.

13. Apparatus according to claim 9, wherein said metal rails have a bearing surface that extend at least as far as the vicinity of an edge of the bearing surfaces of the steel edge profile that lies at a distance from the corner edge area.

14. Apparatus according to claim 9, wherein said metal rails have a surface facing towards the runner device that has a projection which contains the bearing surface and otherwise is essentially not in contact with the ski.

15. Apparatus according to claim 14, wherein said metal rails are otherwise not at all in contact with the ski and the like.

16. Apparatus according to claim 9, wherein said metal rails have an incline on a side facing the corner edge area.

17. Apparatus according to claim 9, further comprising means for cooling said metal rails.

18. Apparatus according to claim 9, further comprising means for cooling said metal rails by liquid.

19. Apparatus according to claim 17, wherein said means for cooling said metal rails employs the thermal capacity of the metal rails.

20. Apparatus according to claim 1, wherein said laser beam means comprises means for directing the point of incidence of the laser beam towards the second outer surface.

21. Apparatus according to claim 1, wherein said laser beam means comprises means for hardening the steel edge profile over a depth ˚f several tenths of a millimeter.

22. Apparatus according to claim 1, wherein said laser beam means comprises means for hardening the steel edge profile over a width between 0.3 and 1.8 mm.

23. Apparatus according to claim 1, wherein said laser beam means comprises means for hardening the steel edge profile over a width of about 1.5 mm.

24. Apparatus according to claim 1, wherein said laser beam means comprises means for hardening the steel edge profile to a hardness of 600-900 HV.

25. Apparatus according to claim 1, wherein said moving means comprises means for moving the laser beam and runner device relative to each other at a speed in the range from 0.5-3 m/min.

26. Apparatus according to claim 1, wherein said moving means comprises means for moving the laser beam relative to the runner device at a speed of about 1.5 m/min.

27. Apparatus according to claim 1, wherein said laser beam means comprises means employing laser power in the range 150-600 W.

28. Apparatus according to claim 1, wherein said laser beam means comprises means employing laser power of about 300 W.

29. Apparatus according to claim 1, wherein said laser beam beams means comprises means for hardening two steel edges simultaneously.

30. Apparatus according to claim 1, wherein said laser beam means comprises means for splitting one laser beam into two laser beams.

31. Apparatus according to claim 1, wherein said laser beam means comprises means for hardening simultaneously two steel edges of the same runner device.

32. Apparatus according to claim 1, wherein said laser beam means comprises means ±or hardening adjacent steel edges of two runner devices moving parallel to one another.

33. Apparatus according to claim 1, wherein said laser beam means comprises means for employing a point of incidence that is greater than the focal point in the focal plane of the laser beam.

* * * * *